US008733430B2

(12) United States Patent
Kikuchi et al.

(10) Patent No.: US 8,733,430 B2
(45) Date of Patent: May 27, 2014

(54) COOLING APPARATUS AND COOLING METHOD FOR ELECTRICAL EQUIPMENT (75) Inventors: Yoshiaki Kikuchi, Toyota (JP); Yusuke Suzuki, Toyota (JP); Tetsuya Ishihara, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1350 days.

(21) Appl. No.: 12/523,064

(22) PCT Filed: Mar. 5, 2008

(86) PCT No.: PCT/JP2008/054433
§ 371 (c)(1),
(2), (4) Date: Jul. 14, 2009

(87) PCT Pub. No.: WO2008/108497
PCT Pub. Date: Sep. 12, 2008

(65) Prior Publication Data
US 2011/0042058 A1    Feb. 24, 2011

(30) Foreign Application Priority Data
Mar. 6, 2007    (JP) .................. 2007-056227

(51) Int. Cl.
G05D 23/00    (2006.01)
(52) U.S. Cl.
USPC .............. 165/297; 165/296; 165/288; 165/41; 62/259.2; 62/186
(58) Field of Classification Search
USPC .......... 165/288, 296, 297, 41; 62/259.2, 186; 320/150; 180/170; 429/62, 120
See application file for complete search history.

(56) References Cited

U.S. PATENT DOCUMENTS 5,490,572 A * 2/1996 Tajiri et al. .................. 180/65.1
6,750,630 B2 * 6/2004 Inoue et al. .................. 320/104
(Continued)

FOREIGN PATENT DOCUMENTS

EP    1309029 A2 *    5/2003    ............ H01M 10/50
JP    59 207565          11/1984
(Continued)

OTHER PUBLICATIONS

Korean Notice of Allowance issued Nov. 30, 2011, in Patent Application No. 10-2009-7014719 (with English-language translation).

(Continued)

Primary Examiner — Marc Norman
Assistant Examiner — Devon Russell
(74) Attorney, Agent, or Firm — Oblon, Spivak, McClelland, Maier & Neustadt, L.L.P.

(57) ABSTRACT

An HV_ECU executes a program including: switching, if an operation is in an A/C intake mode and absolute value of temperature difference Thi−Tlo is larger than a predetermined value A and temperature Thi is smaller than a predetermined value B, the operation mode to a compartment intake mode; switching, if the operation is in the compartment intake mode, the compartment intake mode is requested to prevent increase in temperature difference, the absolute value of temperature difference Thi−Tlo is larger than a predetermined value A and temperature Thi is equal to or larger than the predetermined value B, the operation mode to an A/C intake mode; and executing a normal intake mode switching control.

16 Claims, 8 Drawing Sheets (56) References Cited

U.S. PATENT DOCUMENTS

| | | | |
|---|---|---|---|
| 6,781,349 B2* | 8/2004 | Kimura et al. | 320/150 |
| 7,045,236 B1* | 5/2006 | Andrew et al. | 429/83 |
| 7,102,310 B2* | 9/2006 | Ishishita | 318/268 |
| 7,451,608 B2* | 11/2008 | Kikuchi | 62/186 |
| 7,492,129 B2* | 2/2009 | Aridome | 320/150 |
| 7,647,788 B2* | 1/2010 | Okuda et al. | 62/259.2 |
| 7,771,864 B2* | 8/2010 | Kiya et al. | 429/62 |
| 7,775,268 B2* | 8/2010 | Sato et al. | 165/202 |
| 7,924,562 B2* | 4/2011 | Soma et al. | 361/694 |
| 2002/0189557 A1* | 12/2002 | Williges | 123/41.09 |
| 2003/0211384 A1* | 11/2003 | Hamada et al. | 429/120 |
| 2004/0061480 A1* | 4/2004 | Kimura et al. | 320/150 |
| 2004/0137313 A1* | 7/2004 | Jaura et al. | 429/62 |
| 2004/0163398 A1* | 8/2004 | Morishita et al. | 62/186 |
| 2004/0189260 A1* | 9/2004 | Kimoto | 320/150 |
| 2005/0056472 A1 | 3/2005 | Smith et al. | |
| 2006/0080986 A1* | 4/2006 | Inoue | 62/259.2 |
| 2007/0072061 A1* | 3/2007 | Shimizu | 429/62 |
| 2007/0144804 A1* | 6/2007 | Pike et al. | 180/170 |
| 2007/0210769 A1* | 9/2007 | Tsutsumi et al. | 323/269 |
| 2008/0202137 A1* | 8/2008 | Inoue | 62/186 |

FOREIGN PATENT DOCUMENTS

| | | | | |
|---|---|---|---|---|
| JP | 8 40088 | | 2/1996 | |
| JP | 08040088 A | * | 2/1996 | B60K 11/06 |
| JP | 2001-105843 | | 4/2001 | |
| JP | 2001 130268 | | 5/2001 | |
| JP | 2003 178815 | | 6/2003 | |
| JP | 2004 1674 | | 1/2004 | |
| JP | 2004-90762 | | 3/2004 | |
| JP | 2004281077 A | * | 10/2004 | |
| JP | 2005-19231 | | 1/2005 | |
| JP | 2005-183241 | | 7/2005 | |
| JP | 2006 32013 | | 2/2006 | |
| JP | 2006 143183 | | 6/2006 | |
| JP | 2007 261400 | | 10/2007 | |
| JP | 2007 267494 | | 10/2007 | |
| JP | 2007 331609 | | 12/2007 | |
| JP | 2008021569 A | * | 1/2008 | |
| JP | 2008041376 A | * | 2/2008 | |

OTHER PUBLICATIONS

Office Action issued Apr. 4, 2011 in Korea Application No. 10-2009-7014719 (With English Translation).

Extended European Search Report issued on Dec. 29, 2011 in the corresponding European Application No. 08721849.1.

* cited by examiner

COOLING APPARATUS AND COOLING METHOD FOR ELECTRICAL EQUIPMENT

TECHNICAL FIELD

The present invention relates to cooling of electrical equipment and, more specifically, to a technique of preventing, among a plurality of components included in electrical equipment connected to a medium passage having a plurality of routes, an increase in temperature difference among the components.

BACKGROUND ART

Electric vehicles having a motor for running mounted in place of an engine (including vehicles having the motor for running operated by a fuel cell) have been developed and put to practical use. Further, hybrid vehicles having a motor for running mounted in addition to an engine have also been developed and put to practical use. Such a vehicle is provided with electrical equipment such as a battery for running that outputs driving electric power to the motor for running. The battery for running involves a chemical reaction at the time of charging/discharging and, therefore, it must be cooled to prevent battery degradation caused when the battery attains to a high temperature.

In view of such a problem, Japanese Patent Laying-Open No. 2004-001674 discloses a battery temperature control device that reliably cools an in-vehicle battery. The battery temperature control device is applied to a vehicle having a rear air conditioner unit, which is installed at a rear part of the vehicle and contains air temperature adjusting means for adjusting temperature of the air blown out to the vehicle compartment, and the device controls the temperature of in-vehicle battery. The battery temperature control device has a duct leading the air that has passed through the air temperature adjusting means to the battery, and the air led by the duct is supplied to the battery, whereby the battery temperature is controlled.

According to the laid-open application, by the battery temperature control device, it is possible, when cooling the battery, to lower the air temperature blown to the battery than in the conventional example in which air in the vehicle compartment is blown to the battery.

In the battery temperature control device disclosed in the laid-open application, a plurality of routes are formed, including a route through which the air in the chamber directly flows to the battery and a route for cooling the battery using the air cooled by the air conditioner. The flow rate of air cooled by the air conditioner, however, is limited by the temperature state in the compartment and state of operation of air conditioner. Therefore, the flow rate of air supplied to the battery may also be limited.

When the air flow rate is limited, the flow rate of air supplied to the battery may fluctuate. Further, the temperature of supplied air is lowered by the air conditioner and, therefore, variation in air temperature tends to be large. Consequently, dependent on the shape of battery housing, it becomes difficult to supply air of uniform temperature at uniform flow rate to the entire battery cells. Particularly, when the battery scale becomes larger, it becomes more difficult to supply air of uniform temperature at uniform flow rate to the entire battery cells. This results in increased temperature difference inside the battery.

Electrical equipment such as a battery consists of a plurality of components including battery cells. If temperature difference among the components increases, amount of charge may possibly be different from one battery cell to another, and it would be difficult to control amounts of charge of all battery cells within a predetermined range.

DISCLOSURE OF THE INVENTION

An object of the present invention is to provide a cooling apparatus and a cooling method for electrical equipment that can prevent increase in temperature difference among a plurality of components included in the electrical equipment.

According to an aspect, the present invention provides a cooling apparatus for electrical equipment including a plurality of components. The cooling apparatus includes a medium passage having one end connected to an inlet and the other end connected to the electrical equipment, and having a plurality of cooling medium distribution routes between the inlet and the electrical equipment; a supply unit supplying the cooling medium through the medium passage to the electrical equipment; a detecting unit detecting temperature difference between at least two components on upstream and downstream sides of the cooling medium among the plurality of components; and a selecting unit selecting any one of the plurality of routes. The selecting unit selects, when absolute value of the detected temperature difference exceeds a predetermined value, a route that makes smaller absolute value of temperature difference between the cooling medium and either one of the two components, from among the plurality of distribution routes.

According to the present invention, when temperature difference between at least two components on the upstream side and downstream side of cooling medium distributed through the electrical equipment exceeds a predetermined value, a route that decreases absolute value of temperature difference between the cooling medium and either of the two components is selected from among the plurality of routes. This reduces the degree of temperature decrease of the upstream side component by the cooling medium supplied to the electric vehicle. Therefore, as the degree of cooling of at least the upstream side component is limited, increase in temperature difference between the components can be prevented. Thus, the cooling apparatus and cooling method for electrical equipment that can prevent increase in temperature difference among a plurality of components included in the electrical equipment can be provided.

Preferably, the detecting unit includes a first temperature detecting unit detecting a first temperature of a first component on the upstream side, and a second temperature detecting unit detecting a second temperature of a second component on the downstream side. The selecting unit selects, when the detected second temperature is equal to or higher than a predetermined temperature, a route that maximizes the absolute value of temperature difference between the cooling medium and either one of the first and second temperatures, from among the plurality of distribution routes.

According to the present invention, when the detected second temperature of the downstream side component is equal to or higher than the predetermined temperature, it is determined that the electrical equipment as a whole is over-heated. In such a situation, a route through which cooling medium that attains the largest absolute value of temperature difference between the first and second temperatures, that is, the route through which cooling medium of low temperature flows (for example, a route via an evaporator of air conditioner) is selected, so that the temperature of electrical equipment as a whole can be lowered immediately. This ensures electrical equipment cooling performance.

More preferably, the first component is a component at a position of relatively low temperature among the plurality of components. The second component is a component at a position of relatively high temperature among the plurality of components.

According to the present invention, it is possible to determine, based on the temperature difference between the first temperature of the first component and the second temperature of the second component, whether or not the temperature difference between the components of electrical equipment is increasing. Further, it is possible to determine, from the second temperature of the second component, whether or not the electrical equipment as a whole is over-heated.

More preferably, the cooling apparatus further includes a control unit controlling the supply unit such that, when the route that makes smaller the absolute value of temperature difference is selected, flow rate of the cooling medium is not lower than that when the route that makes larger the absolute value of temperature difference is selected.

According to the present invention, when flow rate of the cooling medium when a route that reduces absolute value of temperature difference is selected is made larger than the flow rate of cooling medium when a route that increases absolute value of temperature difference is selected, temperature increase of the cooling medium distributed to the downstream side resulting from heat exchange with the components can be prevented. As a result, degree of cooling of the downstream side component can be increased. As a result, increase in temperature difference between the upstream side and downstream side components can be prevented.

More preferably, the medium passage is provided with a switching mechanism for switching the distribution route at a position where the distribution route is branched. The selecting unit selects the distribution route by switching the distribution routes by the switching mechanism.

According to the present invention, when the temperature difference between the first and second temperatures increases, the switching mechanism switches the route to that one which makes smaller the temperature difference between the cooling medium and either one of the first and second temperatures (for example, a route that does not pass through the evaporator of air conditioner), so that it is possible to prevent increase in temperature difference among the components of electrical equipment, and when the second temperature is equal to or higher than a predetermined temperature, the switching mechanism switches the route to that one which increases temperature difference between the cooling medium and either one of the first and second temperatures (for example, a route that passes through the evaporator of air conditioner), so that overheated state of the downstream side component can be prevented.

More preferably, the electrical equipment is mounted on a vehicle. The cooling medium is a gas. The supply unit is a first supply unit. The cooling apparatus further includes a second supply unit provided between the inlet and the first supply unit on the distribution route, for supplying the cooling medium to the electrical equipment and to compartment of the vehicle.

According to the present invention, on the distribution route, between the inlet and the first supply unit, a second supply unit for supplying the cooling medium to the electrical equipment is provided. The second supply unit also supplies the cooling medium to the compartment of the vehicle. Specifically, the amount of supply by the second supply unit is limited in accordance with the state of operation of air conditioning. Therefore, when the route that passes through the second supply unit is selected, the amount of supply of the cooling medium to the electrical equipment is also limited. Consequently, cooling tends to be limited to the upstream side component, and temperature difference between the upstream side and downstream side components increases. Here, if the route that passes through the first supply unit but not the second supply unit is selected, the cooling medium can be supplied to the electrical equipment without any limit on the amount of supply. Therefore, cooling is not limited to the upstream side component, and the degree of cooling of the downstream side component can be increased. As a result, increase in temperature difference between the upstream side and downstream side components can be prevented.

More preferably, a heat exchanger is provided on a downstream side of the second supply unit attaining heat exchange with air in the compartment of the vehicle distributed from the inlet. The route that maximizes the absolute value of temperature difference is a route that passes through the second supply unit and the heat exchanger.

According to the present invention, the second supply unit also supplies the cooling medium to the compartment of the vehicle. Specifically, the amount of supply by the second supply unit is limited in accordance with the state of operation of air conditioning. Therefore, when the route that passes through the second supply unit and the heat exchanger is selected, the amount of supply of the cooling medium to the electrical equipment is also limited. Consequently, cooling tends to be limited to the upstream side component, and temperature difference between the upstream side and downstream side components increases. Here, if the route that passes through the first supply unit but not through the second supply unit and the heat exchanger is selected, the cooling medium can be supplied to the electrical equipment without any limit on the amount of supply. Therefore, cooling is not limited to the upstream side component, and the degree of cooling of the downstream side component can be increased. As a result, increase in temperature difference between the upstream side and downstream side components can be prevented.

More preferably, the electrical equipment is a power storage device formed of a plurality of power storage elements.

According to the present invention, the electrical equipment is a power storage device formed of a plurality of power storage elements. Therefore, when temperature difference among power storage elements increases, it becomes difficult to control the amount of charge in all power storage elements within a predetermined range. Application of the present invention prevents increase in temperature difference among the power storage elements.

BEST MODES FOR CARRYING OUT THE INVENTION

In the following, embodiments of the present invention will be described with reference to the figures. In the following description, the same components are denoted by the same reference characters. Their names and functions are also the same. Therefore, detailed description thereof will not be repeated.

Figure 1:
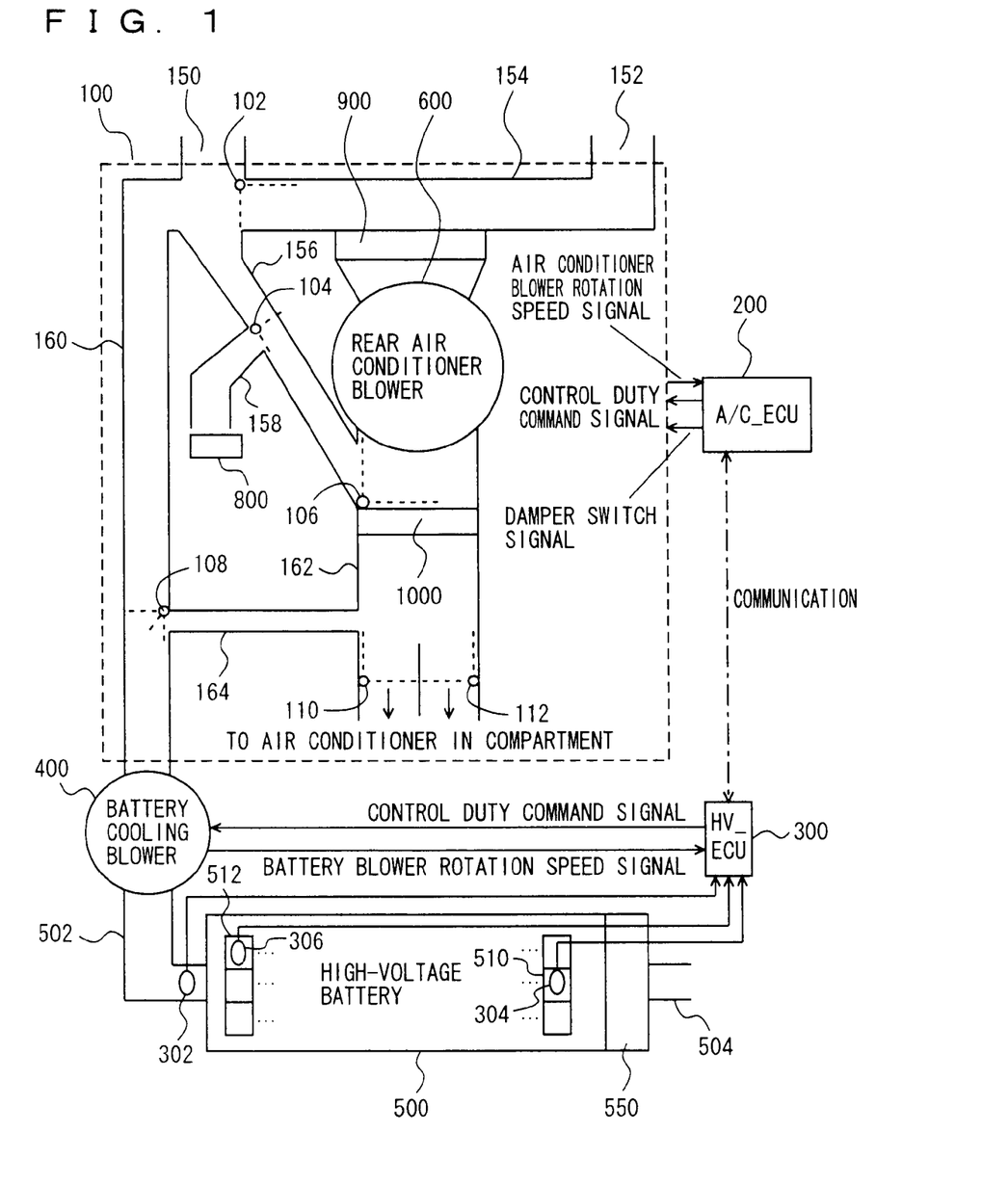
FIG. 1 shows a configuration of a cooling apparatus for electrical equipment in accordance with a first embodiment.

As shown in FIG. 1, the cooling apparatus for electrical equipment in accordance with the present embodiment includes a rear air conditioner unit 100, an air conditioner (hereinafter also denoted as A/C) ECU (Electronic Control Unit) 200, an HV_ECU 300 and a battery cooling blower 400.

In the present embodiment, the "electrical equipment" is described as a high-voltage battery 500. The electrical equipment, however, is not specifically limited to the high-voltage battery and it may be a power storage device such as a capacitor or a fuel cell, an inverter, or other electrical equipment.

Further, in the present embodiment, high-voltage battery 500 is mounted on a hybrid vehicle having a rotating electric machine and an internal combustion engine as driving sources. High-voltage battery 500 supplies electric power to the rotating electric machine. The vehicle is not limited to a hybrid vehicle and it may be any vehicle having a battery, such as an electric vehicle or a fuel cell vehicle, or a vehicle having an internal combustion engine as a driving source.

High-voltage battery 500 is mounted between a rear seat provided in the compartment and a trunk room provided on the rear side of the vehicle (both not shown). The position where high-voltage battery 500 is mounted is not limited to the above. Further, application of the present invention is not limited to electrical equipment mounted on a vehicle.

Rear air conditioner unit 100 is provided between the rear seat provided in the compartment and the trunk room provided on the rear side of the vehicle. In rear air conditioner unit 100, a medium passage is formed, through which a cooling medium is distributed, and a rear air conditioner blower 600 is provided on a route in the middle of the medium passage. In the present embodiment, the cooling medium is described as air. The medium, however, is not specifically limited to air, and a gas other than air, or liquid may be used.

The medium passage is connected to inlets 150 and 152 provided in the compartment, and connected to battery cooling blower 400 and an outlet (not shown) of air conditioner in the compartment.

The medium passage is formed of cooling ducts 154, 156, 158, 160, 162, 164, 502 and 504, and switch dampers 102, 104, 106, 108, 110 and 112. The medium passage has a plurality of air distribution routes realized by switching of switch dampers 102, 104, 106, 108, 110 and 112.

Inlets 150 and 152 are connected by cooling duct 154, and by the operation of rear air conditioner unit 100 or battery cooling blower 400, take in air in the compartment of the vehicle. Further, between inlets 150 and 152 of cooling duct 154, switch damper 102 is provided. By the switching of switch damper 102, a route between inlets 150 and 152 through cooling duct 154 is rendered communicable or shut-off.

One end of cooling duct 154 on the side of inlet 150 is connected to one end of cooling duct 156 and one end of cooling duct 160. The other end of cooling duct 156 is connected to a middle portion of cooling duct 162. Further, to a middle portion of cooling duct 156, one end of cooling duct 158 is connected.

At a branch position between cooling ducts 156 and 158, switch damper 104 is provided. By the switching of switch damper 104, the route between cooling ducts 156 and 158 may be shut off, or cooling duct 158 and a part of cooling duct 156 on the side connected to cooling duct 162 is communicated, while one end and the other end of cooling duct 156 are shut off. The other end of cooling duct 158 is connected to trunk room 800.

At the other end of cooling duct 156, switch damper 106 is provided. By the switching of switch damper 106, cooling ducts 156 and 162 are communicated, cross-sectional area of the passage of cooling duct 162 is reduced, or communication between cooling ducts 156 and 162 is shut-off.

One end of cooling duct 162 is connected to the middle of cooling duct 154. On the side of the one end of cooling duct 162, a filer 900 is provided. Filter 900 removes foreign matter such as dirt and dust from the air passing therethrough. In the middle of cooling duct 162 and between the branching position of cooling duct 156 and filer 900, rear air conditioner blower 600 is provided. The other end of cooling duct 162 is connected to the outlet of air conditioner in the compartment.

In the middle of cooling duct 162 on the side closer to the outlet of air conditioner in the compartment from the branching position of cooling duct 164, switch dampers 110 and 112 are provided. By the switching of dampers 110 and 112, one end and the other end of cooling duct 162 are communicated, one end and the other end of cooling duct 162 are shut off, or by the switching of either one of switch dampers 110 and 112, the cross-sectional area of the passage in the middle of cooling duct 162 is reduced.

Further, in the middle of cooling duct 162 and on the side closer to the air conditioner outlet than the branching position to cooling duct 156, an evaporator 1000 as a "heat exchanger" is provided. Evaporator 1000 itself is cooled as the coolant therein evaporates, and when air supplied from rear air conditioner blower 600 contacts, the air temperature lowers. The structure of evaporator 1000 is well-known and, therefore, detailed description thereof will not be given here.

Further, in the middle of cooling duct 162 and between evaporator 1000 and switch dampers 110 and 112, one end of cooling duct 164 is connected. Further, the other end of cooling duct 164 is connected to the middle portion of cooling duct 160.

At the branch position of cooling ducts 164 and 160, switch damper 108 is provided. By the switching of switch damper 108, communication between cooling ducts 160 and 164 is shut off, one end and the other end of cooling duct 160 is shut off and cooling ducts 160 and 164 are communicated, or cooling ducts 160 and 164 are communicated and one end and the other end of cooling duct 160 are communicated.

The other end of cooling duct 160 is connected to battery cooling blower 400. Battery cooling blower 400 is connected through cooling duct 502 to high-voltage battery 500. The air fed from battery cooling blower 400 is supplied to high-voltage battery 500.

The air discharged from high voltage battery 500 is supplied to a DC/DC converter 550. To DC/DC converter 550, one end of cooling duct 504 is connected. To cooling duct 504, the air of which temperature has been increased by heat exchange at high voltage battery 500 and DC/DC converter 550 is discharged. The other end of cooling duct 504 is, by way of example, formed to communicate to the outside of the vehicle, though it is not limiting. It may be connected to the trunk room, or it may be connected to the compartment, or it may be circulated to rear air conditioner unit 100.

Switch dampers 102, 104, 106, 108, 110 and 112 continuously switch damper positions (angles) in response to switching signals from A/C_ECU 200, though not limiting. By way of example, these may selectively change a predetermined plurality of positions (for example, two positions) in response to the switching signal from A/C_ECU 200.

Further, an intake air temperature detection sensor 302 is provided for detecting temperature of the air taken to high-voltage battery 500, in the passage in the middle of cooling duct 502. Intake air temperature detection sensor 302 transmits a signal indicating the detected air temperature TC to HV_ECU 300.

In the present embodiment, high-voltage battery 500 is a battery pack of a substantially parallelepiped shape, including a battery module assembly formed by combining a plurality of battery modules which in turn is formed by connecting a plurality of battery cells in series, and a housing accommodating the battery module assembly.

The air supplied to high-voltage battery 500 is circulated in the housing and contacts the battery module assembly therein, so that heat exchange takes place. Therefore, the heat generated at the time of charging/discharging in the battery module assembly is transmitted to the air and the temperature of battery module assembly decreases and the assembly is cooled.

Specifically, the air supplied to high voltage battery 500 is supplied through an inlet provided on an upper portion of a side surface of high voltage battery 500. The air supplied to the upper portion of the side is diffused entirely to the upper portion of high voltage battery 500 and distributed through spaces between battery cells or battery modules, and goes to the lower portion of high voltage battery 500. The air that has moved to the lower portion is discharged through the outlet provided at a lower portion of the same side surface from which the air was supplied. During this period, heat exchange takes place between the air and the battery cells and battery modules. The positions where the inlet and outlet are provided on high voltage battery 500 are not specifically limited to one side surface.

The air discharged from high voltage battery 500 further cools DC/DC converter 550. DC/DC converter 500 is electrically connected between high voltage battery 500 and a load, and boosts the voltage of high voltage battery 500.

Inside the high voltage battery 500, battery temperature detection sensors 304 and 306 are provided for detecting the temperature of high voltage battery 500. Battery temperature detection sensor 304 is provided on downstream side of air flowing through the housing of high voltage battery 500. Battery temperature detection sensor 306 is provided on the upstream side of the air flowing through the housing of high voltage battery 500.

Preferably, battery temperature detection sensor 304 detects the temperature of a battery cell 510 at a position of relatively high temperature among the plurality of battery cells as the "components" included in high voltage battery 500, while battery temperature detection sensor 306 desirably detects the temperature of a battery cell 512 at a position of relatively low temperature among the plurality of battery cells included in high voltage battery 500.

Battery temperature detection sensor 304 transmits a signal indicating the detected temperature Tlo of battery cell 510 to HV_ECU 300. Battery temperature detection sensor 306 transmits a signal indicating the detected temperature Thi of battery cell 512 to HV_ECU 300.

Battery cooling blower 400 includes an electric motor and a cooling fan (both not shown). To battery cooling blower 400, a duty control command signal is transmitted from HV_ECU 300. The electric motor of battery cooling blower 400 is driven based on the received duty control command signal. As the electric motor is driven, the cooling fan rotates, and air is supplied from battery cooling blower 400 to high-voltage battery 500.

Rear air conditioner blower 600 includes an electric motor and a cooling fan (both not shown). To rear air conditioner blower 600, a duty control command signal is transmitted from A/C_ECU 200. The electric motor of rear air conditioner blower 600 is driven based on the received duty control command signal. As the electric motor is driven, the cooling fan rotates, and air is supplied from rear air conditioner blower 600 to evaporator 1000.

The battery cooling blower 400 corresponds to the "first supply means", and the rear air conditioner blower 600 corresponds to the "second supply means."

Further, a rotation speed detection sensor (not shown) for detecting the rotation speed of the electric motor or the cooling fan is provided on battery cooling blower 400. The rotation speed sensor transmits a signal indicating the rotation speed of the electric motor or the cooling fan to HV_ECU 300. Based on temperatures Thi and Tlo of battery cells 510 and 512, intake air temperature TC and the rotation speed of battery cooling blower fan 400, HV_ECU 300 generates a duty control command signal.

Further, a rotation speed detection sensor (not shown) for detecting the rotation speed of the electric motor or the cooling fan is provided on rear air conditioner blower 600. The rotation speed detection sensor transmits a signal indicating the rotation speed of the electric motor or the cooling fan to A/C_ECU 200.

The rotation speed detection sensor may be realized, for example, by a resolver or the like provided on the electric motor, though not limiting. For instance, a hole device or the like may be used to detect the rotation speed of the electric motor or the cooling fan.

A/C_ECU 200 controls switch dampers 102, 104, 106, 108, 110 and 112 such that at least one of these is switched, in accordance with the state of operation of rear air conditioner unit 100 or room temperature. A/C_ECU 200 is connected to HV_ECU 300 to enable bi-directional communication. Therefore, in response to a request for switching dampers from HV_ECU 300, A/C_ECU 200 controls switch dampers 102, 104, 106, 108, 110 and 112 such that at least one of these is switched. As a result, one route is selected from a plurality of predetermined routes that pass through rear air conditioner unit 100, battery cooling blower fan 400 and high voltage battery 500.

HV_ECU 300 controls the state of charge of high-voltage battery 500, controls battery cooling blower 400 in accordance with the state of high-voltage battery 500, and controls the rotating electrical machine and other electrical equipment mounted on the vehicle, in accordance with the state of the vehicle. Though HV_ECU 300 and A/C_ECU 200 are described as two ECUs capable of bi-directional communication in the present embodiment, one ECU having integrated functions of HV_ECU 300 and A/C_ECU 200 may be used.

In the present embodiment having the configuration as above, A/C_ECU 200 selects one distribution route among the plurality of air distribution routes of the medium passage, in accordance with the switch request from HV_ECU 300 or state of operation of rear air conditioner unit 100. Specifically, A/C_ECU 200 transmits a damper switching signal to at least one of switch dampers 102, 104, 106, 108, 110 and 112, so that air is distributed along any one of the predetermined plurality of air distribution routes in the medium passage, based on the switch request signal from HV_ECU 300, compartment temperature or state of operation of rear air conditioner unit 100.

Figure 2:
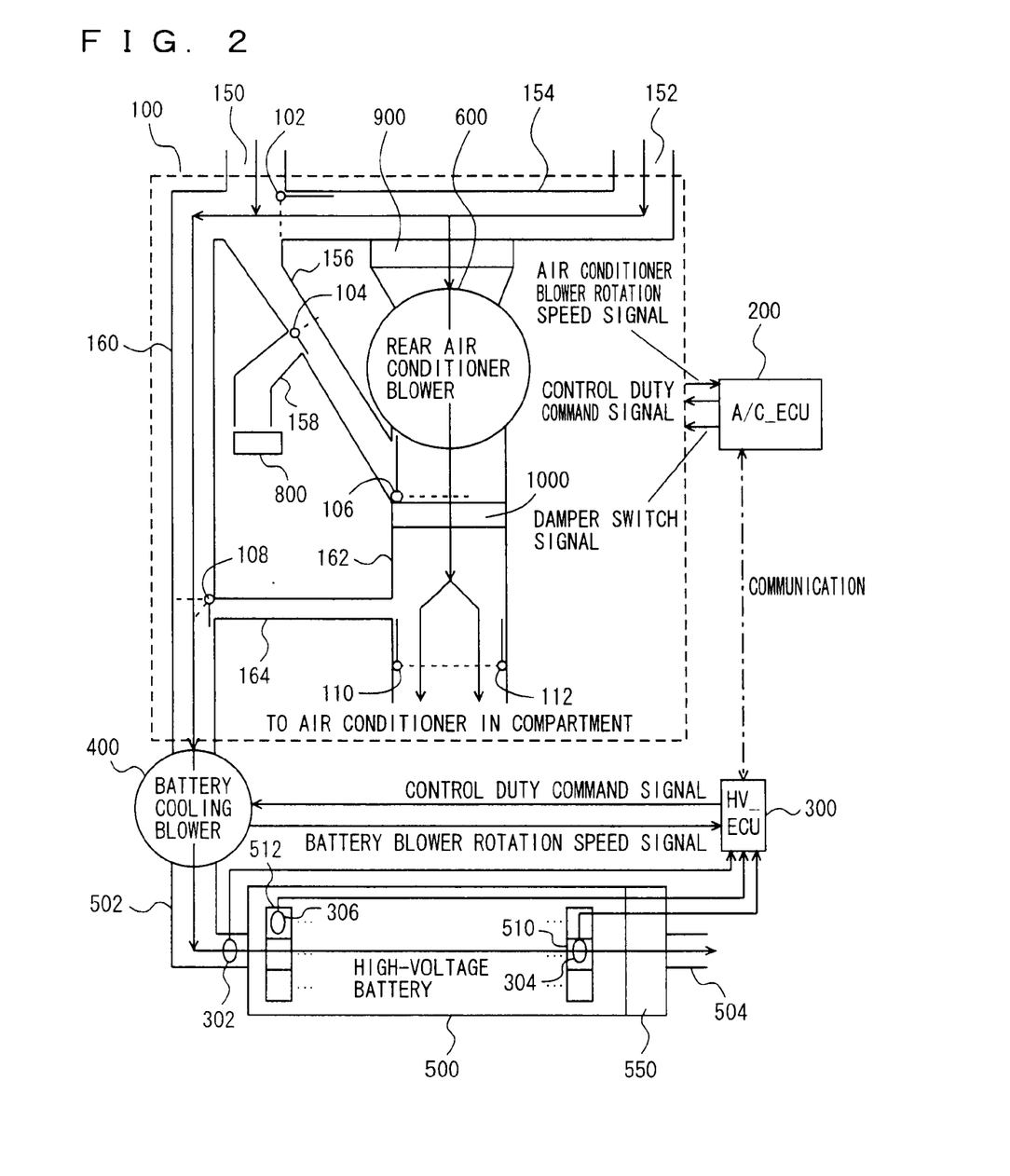
FIG. 2 shows air flow in a compartment intake mode.

By way of example, when the air taken in through inlets 150 and 152 are supplied separately to distribution route of air used for cooling high-voltage battery 500 and the distribution route of air used for air conditioning as shown in FIG. 2, A/C_ECU 200 switches switch damper 102 such that the space between inlets 150 and 152 at opposite ends of cooling duct 154 are communicated. Further, A/C_ECU 200 switches switch damper 106 such that communication between cooling duct 156 and cooling duct 162 is shut off. A/C_ECU 200 may switch switch damper 104 such that one end and the other end of cooling duct 156 are shut off. Further, A/C_ECU 200 switches switch damper 108 such that the route between cooling duct 164 and cooling duct 160 is shut off.

When battery cooling blower 400 operates with the switch dampers 102, 104, 106, 108, 110 and 112 switched in the above-described manner, the air in the compartment is introduced through inlets 150 and 152, as represented by a solid arrow in FIG. 2. The air introduced to inlet 150 flows though cooling duct 160, and taken into battery cooling blower 400. By the operation of battery cooling blower 400, the air fed with pressure from the cooling fan is supplied to high-voltage battery 500. The air supplied to high-voltage battery 500 takes part in the heat exchange with the battery module assembly in high-voltage battery 500, and thereafter, the air is discharged to cooling duct 504. At this time, the heat of battery module assembly is transmitted to the air.

When rear air conditioner unit 100 operates, the air introduced through inlets 150 and 152 flows through cooling duct 154, passes through filer 900, and taken into rear air conditioner blower 600. By the operation of rear air conditioner blower 600, the air fed with pressure from the cooling fan is supplied to cooling duct 162. The air supplied to air cooling duct 162 passes through evaporator 1000. The air that has passed through evaporator 1000 is subjected to heat exchange with evaporator 1000, and discharged through air conditioner outlet in the compartment to the compartment. The heat of air is transmitted to evaporator 1000. Therefore, as compared with the temperature of air taken through inlet 152, the air discharged from the outlet has lower temperature.

In the following description, an operation mode of rear air conditioner unit 100 in which the air circulates through the route of solid arrows in FIG. 2 will be described as "compartment intake mode." In the compartment intake mode, switch damper 102 may be switched such that the route between inlets 150 and 152 of cooling duct 154 is shut off. In that case, the air taken through inlet 150 flows through battery cooling blower 400 to high voltage battery 500, and the air taken through inlet 152 flows through rear air conditioner blower 600 to the air conditioner outlet in the compartment.

Further, HV_ECU 300 transmits a control duty command signal to battery cooling blower 400 so that air of predetermined flow rate is supplied from battery cooling blower 400.

Figure 3:
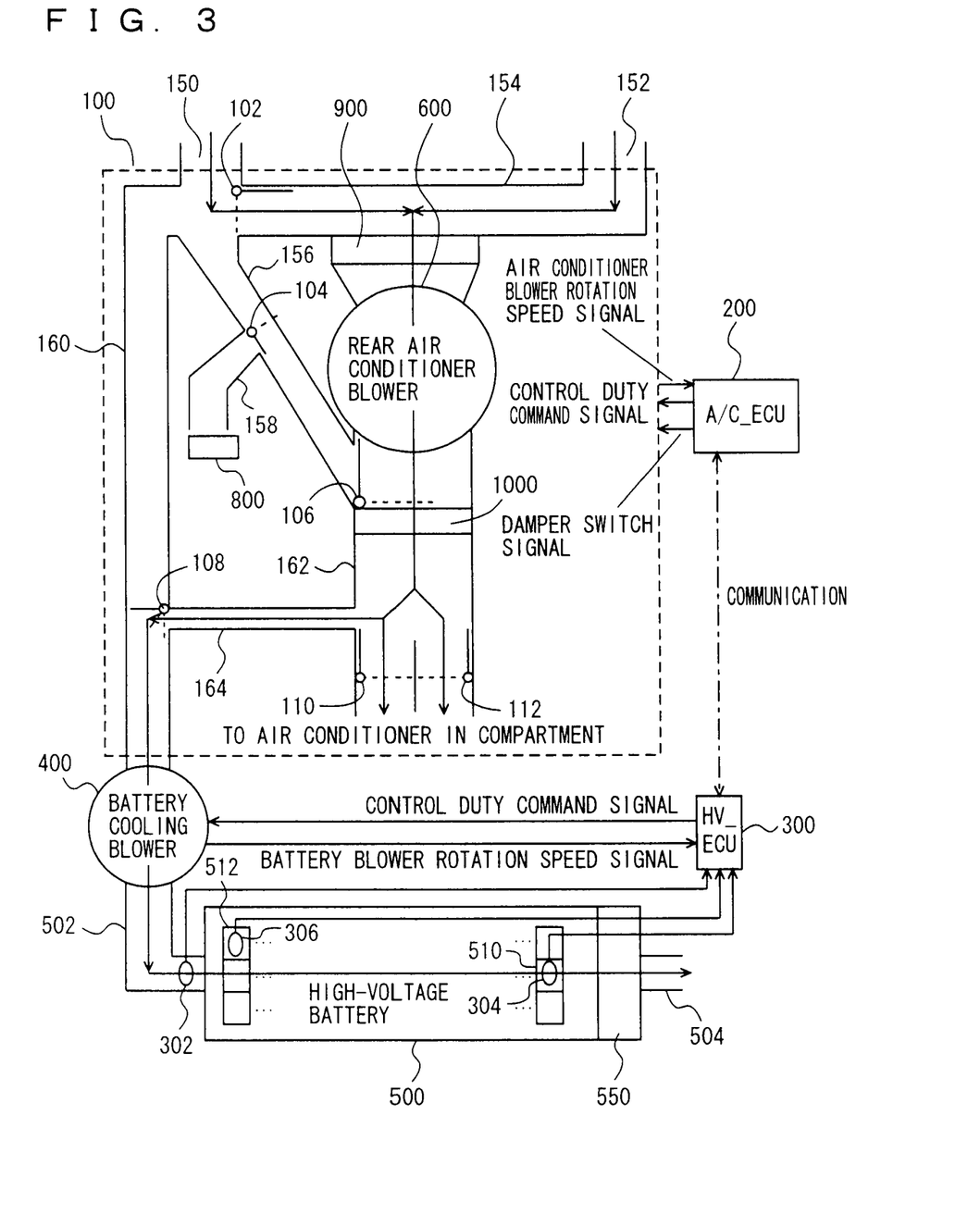
FIG. 3 shows air flow in an A/C intake mode.

On the other hand, referring to FIG. 3, when the air of which temperature is made lower by rear air conditioner unit 100 is used for air conditioning in the compartment and for cooling high-voltage battery 500, A/C_ECU 200 switches switch damper 102 so that inlets 150 and 152 provided at opposite ends of cooling duct 154 are communicated. Further, A/C_ECU 200 switches switch damper 106 such that communication between cooling ducts 156 and 162 is shut off.

Further, A/C_ECU 200 switches switch damper 108 such that one end and the other end of cooling duct 160 are shut off.

Further, A/C_ECU 200 switches switch dampers 110 and 112 such that in cooling duct 162, the side of rear air conditioner blower 600 and the side of air conditioner outlet are communicated.

When battery cooling blower 400 and air conditioner blower 600 operate with the switch dampers 102, 104, 106, 108, 110 and 112 switched in the above-described manner, the air in the compartment is introduced to inlets 150 and 152, as shown by the solid arrow in FIG. 3.

The air introduced to inlets 150 and 152 flows through cooling duct 154, passes through filter 900, and taken into rear air conditioner blower 600. By the operation of rear air conditioner blower 600, the air fed with pressure from the cooling fan is supplied to cooling duct 162. The air supplied to cooling duct 162 passes through evaporator 1000.

The air that has passed through evaporator 1000 is subjected to heat exchange with evaporator 1000, and then distributed through cooling duct 164 and air conditioner outlet in the compartment to the compartment. The heat of air is transmitted to evaporator 1000. Therefore, as compared with the temperature of air taken through inlets 150 and 152, the air distributed to the compartment through cooling duct 164 and air conditioner outlet has lower temperature.

The air that flows through cooling duct 164 is further introduced to cooling duct 160, and taken by battery cooling blower 400. By the operation of battery cooling blower 400, the air fed with pressure from the cooling fan is supplied to high-voltage battery 500. The air supplied to high-voltage battery 500 takes part in the heat exchange with the battery module assembly in high-voltage battery 500, and thereafter, the air is discharged to cooling duct 504. The heat of battery module assembly is transmitted to the air. In the following description, the operation mode of rear air conditioner unit 100 in which the air flows through the route represented by solid arrow in FIG. 3 will be referred to as "A/C intake mode."

Further, A/C_ECU 200 transmits a control duty command signal to rear air conditioner blower 600 so that air of the flow rate in accordance with the temperature state of the vehicle compartment is supplied from rear air conditioner blower 600. Further, HV_ECU 300 transmits a control duty command signal to battery cooling blower 400 so that air of the flow rate set based on the amount of operation of rear air conditioner blower 600 is supplied from battery cooling blower 400.

In the cooling apparatus having the above-described structure, the present invention is characterized in that when temperature difference between at least two components on the upstream side and downstream side of cooling medium among a plurality of components included in electrical equipment exceeds a predetermined value, HV_ECU 300 selects a route that decreases absolute value of temperature difference between the cooling medium and either one of the two components, from among the plurality of routes.

More specifically, when rear air conditioner unit 100 is operating in the A/C intake mode and the absolute value of difference between temperatures Thi and Tlo detected by battery temperature detection sensors 304 and 306 exceeds a predetermined value, HV_ECU 300 controls switch dampers 102, 104, 106, 108, 110 and 112 to switch the operation to the compartment intake mode.

Figure 4:
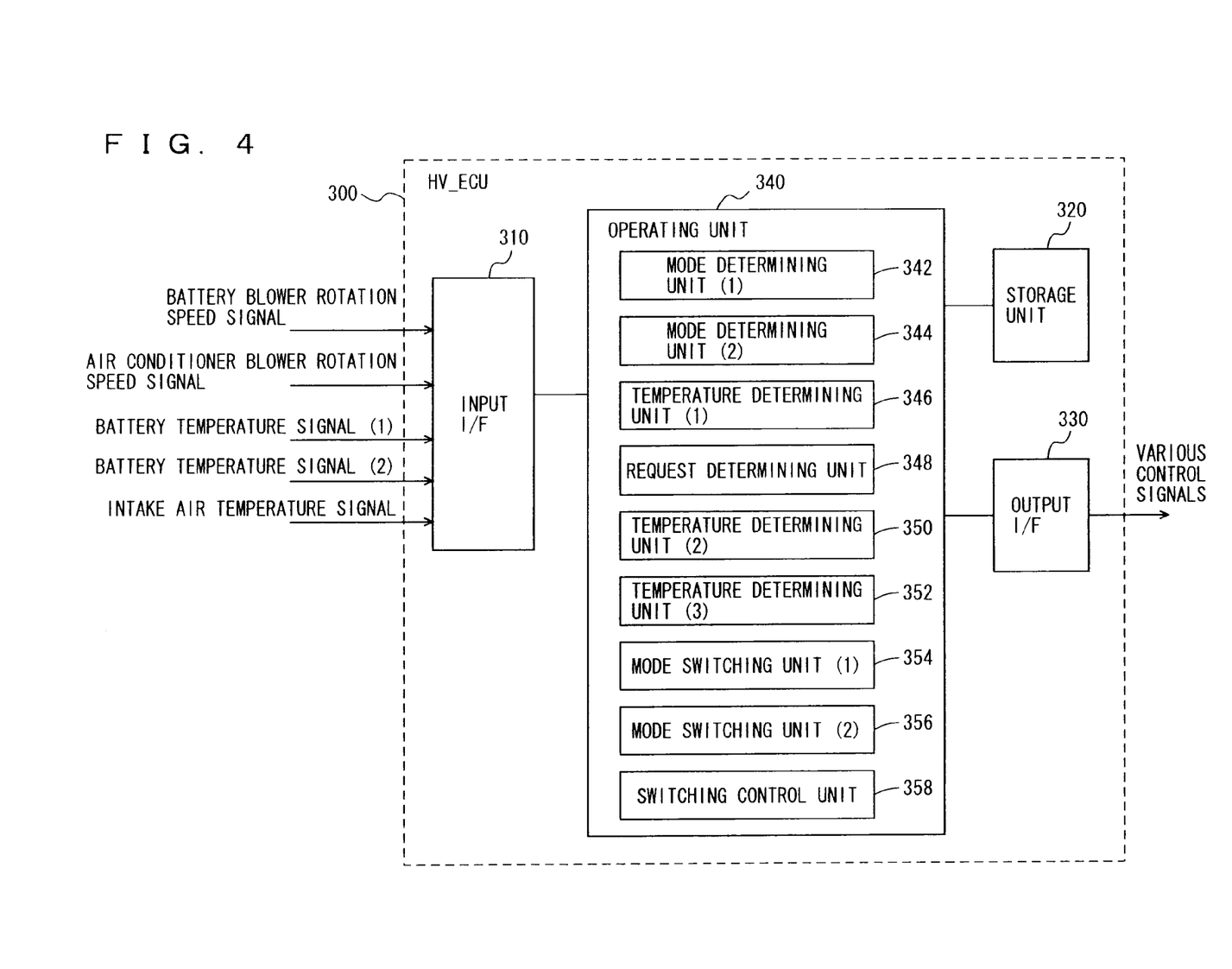
FIG. 4 is a functional block diagram of an HV_ECU included in the cooling apparatus for electrical equipment in accordance with the embodiment.

FIG. 4 is a functional block diagram of HV_ECU 300 included in the cooling apparatus for electrical equipment in accordance with the present embodiment.

HV_ECU 300 includes an input interface (hereinafter denoted as input I/F) 310, an operating unit 340, a storage unit 320, and an output interface (hereinafter denoted as output I/F) 330.

Input I/F 310 receives a battery blower rotation speed signal from battery cooling blower 400, an air conditioner blower rotation speed signal from rear air conditioner blower 600, a battery temperature signal (1) indicating temperature Thi from battery temperature detection sensor 304, a battery temperature signal (2) indicating temperature Tlo from battery temperature detection sensor 306, and an intake air temperature signal from intake air temperature detection sensor 302, and transmits these signals to operating unit 340.

Operating unit 340 includes a mode determining unit (1) 342, a mode determining unit (2) 344, a temperature determining unit (1) 346, a request determining unit 348, a temperature determining unit (2) 350, a temperature determining unit (3) 352, a mode switching unit (1) 354, a mode switching unit (2) 356, and a switch control unit 358.

Mode determining unit (1) 342 determines whether or not the operation mode of rear air conditioner unit 100 is in the A/C intake mode. By way of example, when the operation mode of rear air conditioner unit 100 is switched from other mode to A/C intake mode, a flag corresponding to the A/C intake mode may be set on, and if the flag is on, mode determining unit (1) 342 may determine that the operation is in the A/C intake mode. Alternatively, mode determining unit (1) 342 may determine that the operation is in the A/C intake mode if the state of operation of switch damper 102 corresponds to the A/C intake mode. Further, mode determining unit (1) 342 may set on a mode determination flag (1) if the operation is determined to be in the A/C intake mode.

Mode determining unit (2) 344 determines whether or not the operation mode of rear air conditioner unit 100 is the compartment intake mode. By way of example, when the operation mode of rear air conditioner unit 100 is switched from other mode to compartment intake mode, a flag corresponding to the compartment intake mode may be set on, and if the flag is on, mode determining unit (2) 344 may determine that the operation is in the compartment intake mode. Alternatively, mode determining unit (2) 344 may determine that the operation is in the compartment intake mode if the state of operation of switch damper 102 corresponds to the compartment intake mode. Further, mode determining unit (2) 344 may set on a mode determination flag (2) if the operation is determined to be in the compartment intake mode.

Temperature determining unit (1) 346 determines whether the absolute value of temperature difference between temperature Thi detected by battery temperature detection sensor 304 and temperature Tlo detected by battery temperature detection sensor 306 is larger than a predetermined value A and whether temperature Thi is smaller than a predetermined value B. "Predetermined value A" is not specifically limited and it may be any value that allows determination that temperatures of battery cells 510 and 512 included in high voltage battery 500 fluctuate, and may be experimentally adjusted. If it is determined that the absolute value of difference between temperatures Tlo and Thi is larger than the predetermined value A and temperature Thi is smaller than the predetermined value B, temperature determining unit (1) 346 may set on a temperature determination flag (1). Further, as there is a relation of Thi>Tlo, it may determine whether or not the value of temperature difference Thi−Tlo is larger than the predetermined value A.

Request determining unit 348 determines, when the operation mode of rear air conditioner unit 100 is switched to the compartment intake mode, whether or not the compartment intake mode is requested to prevent increase in temperature difference between Thi and Tlo, that is, to prevent increase in temperature variation between battery cells 510 and 512 of high voltage battery 500.

Specifically, if the operation mode of rear air conditioner unit 100 is the compartment intake mode, the absolute value of temperature difference between Thi and Tlo is larger than the predetermined value A and Thi is smaller than the predetermined value B, request determining unit 348 determines that the compartment intake mode is requested in order to prevent increase in temperature difference. "Predetermined value B" is not specifically limited and it may be any value that allows determination that high voltage battery 500 as a whole is overheated, and it may be experimentally adjusted. If it is determined that the compartment intake mode is requested, request determining unit 348 may set on a request determination flag.

Temperature determining unit (2) 350 determines whether or not temperature difference between temperature Thi detected by battery temperature detection sensor 304 and temperature Tlo detected by battery temperature detection sensor 306 is larger than a predetermined value A. If it is determined that the absolute value of temperature difference between Thi and Tlo is equal to or smaller than the predetermined value A, for example, temperature determining unit (2) 350 may set on a temperature determination flag (2).

Temperature determining unit (3) 352 determines whether or not the temperature Thi detected by battery temperature detection sensor 304 is equal to or higher than the predetermined value B. If it is determined that Thi is equal to or higher than the predetermined value B, temperature determining unit (3) 352 may set on a temperature determination flag (3).

If it is determined by mode determining unit (1) 342 that the operation mode of rear air conditioner unit 100 is the A/C intake mode and by temperature determining unit (1) 346 that the absolute value of temperature difference between temperatures Thi and Tlo is larger than the predetermined value A and temperature Thi is smaller than the predetermined value B, mode switching unit (1) 354 switches the operation mode from the A/C intake mode to compartment intake mode.

Specifically, mode switching unit (1) 354 generates switching signals to set switch dampers 102, 104, 106, 108, 110 and 112 to the states of operation corresponding to the compartment intake mode, and transmits the signals through output I/F 330 and A/C_ECU 200 to switch dampers 102, 104, 106, 108, 110 and 112.

It is noted that if the mode determination flag (1) is on and temperature determination flag (1) is on, mode switching unit (1) 354 may switch the operation mode of rear air conditioner unit 100 to the compartment intake mode.

If it is determined by mode determining unit (2) 344 that the operation mode of rear air conditioner unit 100 is the compartment intake mode, by request determining unit 348 that the compartment intake mode is requested, by temperature determining unit (2) 350 that the absolute value of temperature difference between temperatures Thi and Tlo is larger than the predetermined value A and by temperature determining unit (3) 352 that the temperature Thi is equal to or higher than the predetermined value B, mode switching unit (2) 356 switches the operation mode to the A/C intake mode.

Specifically, mode switching unit (2) 356 generates switching signals to set switch dampers 102, 104, 106, 108, 110 and 112 to the states of operation corresponding to the A/C intake mode, and transmits the signals through output I/F 330 and A/C_ECU 200 to switch dampers 102, 104, 106, 108, 110 and 112.

It is noted that if the mode determination flag (2) is on, request determination flag is on, temperature determination flag (2) is off and temperature determination flag (3) is on, mode switching unit (2) 356 may switch the operation mode or rear air conditioner unit 100 to the A/C intake mode.

If the operation mode of rear air conditioner unit 100 is neither the A/C intake mode nor the compartment intake mode, and the operation mode cannot be switched to the A/C intake mode or compartment intake mode based on the temperature difference between temperatures Thi and Tlo or based on the temperature Thi, switch control unit 358 executes a normal intake mode switching control.

Specifically, switch control unit 358 selects an operation mode in accordance with the state of operation of rear air conditioner unit 100 or temperature condition of the compartment, generates switching signals to set switch dampers 102, 104, 106, 108, 110 and 112 to the state of operation corresponding to the selected operation mode, and transmits the signals through output I/F 330 and A/C_ECU 200 to switch dampers 102, 104, 106, 108, 110 and 112.

Further, in the present embodiment, mode determining unit (1) 342, mode determining unit (2) 344, temperature determining unit (1) 346, request determining unit 348, temperature determining unit (2) 350, temperature determining unit (3) 352, mode switching unit (1) 354, mode switching unit (2) 356 and switch control unit 358 are all described as software functions realized by CPU as the operating unit 340 executing a program stored in storage unit 320. These units, however, may be realized by hardware. Such a program is recorded on a recording medium and mounted on the vehicle.

Storage unit 320 stores various pieces of information, programs, threshold values, maps and the like, and data is read or stored as needed, by operating unit 340.

Figure 5:
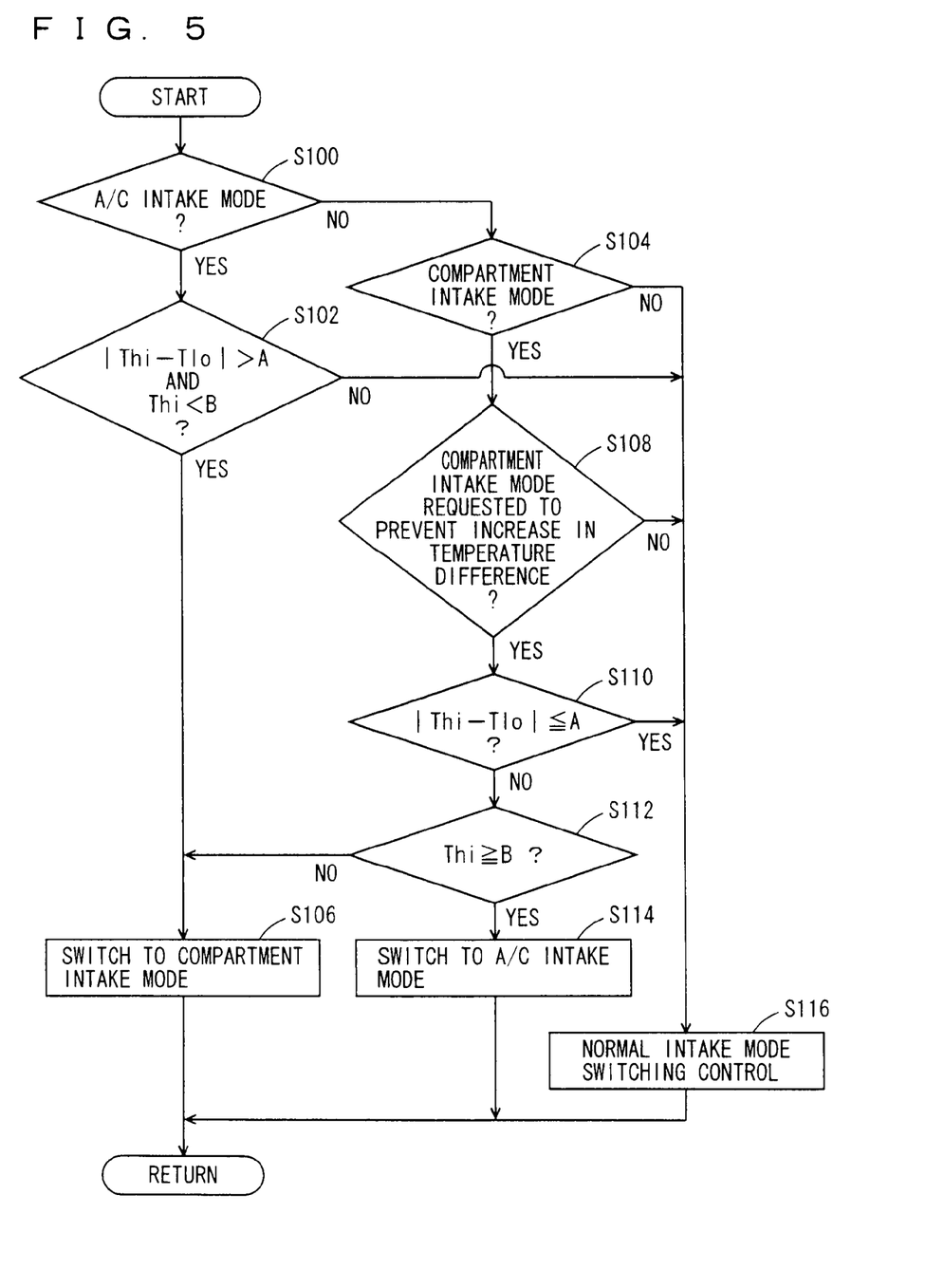
FIG. 5 is a flowchart representing a control structure of a program executed by the HV_ECU included in the cooling apparatus for electrical equipment in accordance with the embodiment.

In the following, a control structure of a program executed by HV_ECU 300 included in the cooling apparatus for electrical equipment in accordance with the present embodiment will be described with reference to FIG. 5.

At step (hereinafter "step" will be denoted by S) 100, HV_ECU 300 determines whether or not the operation mode of rear air conditioner unit 100 is the A/C intake mode. If the operation mode of rear air conditioner unit 100 is the A/C intake mode (YES at S100), the process proceeds to S102. If not (NO at S100), the process proceeds to S104.

At S102, HV_ECU 300 determines whether the absolute value of difference between temperatures Thi detected by battery temperature detection sensor 304 and temperature Tlo detected by battery temperature detection sensor 306 is larger than the predetermined value A and temperature Thi is smaller than the predetermined value B. If the absolute value of temperature difference Thi−Tlo is larger than the predetermined value A and the temperature Thi is smaller than the predetermined value B (YES at S102), the process proceeds to S106. Otherwise (NO at S102), the process proceeds to S116.

At S104, HV_ECU 300 determines whether or not the operation mode of rear air conditioner unit 100 is the compartment intake mode (YES at S104). If the operation mode of rear air conditioner unit 100 is compartment intake mode (YES at S104), the process proceeds to S108. If not (NO at S104), the process proceeds to S116.

At S106, HV_ECU 300 transmits switching signals to switch dampers 102, 104, 106, 108, 110 and 112 through A/C_ECU 200 so that the operation mode of rear air conditioner unit 100 is switched to the compartment intake mode. At S108, HV_ECU 300 determines whether or not the compartment intake mode is requested in order to prevent increase in temperature difference between temperatures Thi and Tlo. If it is the case that the compartment intake mode is requested (YES at S108), the process proceeds to S110. If not (NO at S108), the process proceeds to S116.

At S110, HV_ECU 300 determines whether the absolute value of temperature difference Thi−Tlo is equal to or smaller than the predetermined value A. If it is equal to or smaller than the predetermined value A (YES at S110), the process proceeds to S116. If not (NO at S110), the process proceeds to S112.

At S112, HV_ECU 300 determines whether or not the temperature Thi is equal to or higher than the predetermined value B. If it is equal to or higher than the predetermined value B (YES at S112), the process proceeds to S114. If not (NO at S112), the process proceeds to S116.

At S114, HV_ECU 300 transmits switching signals to switch dampers 102, 104, 106, 108, 110 and 112 through A/C_ECU 200 so that the operation mode of rear air conditioner unit 100 is switched to the A/C intake mode. At S116, HV_ECU 300 executes normal intake mode switching control in relation to the operation mode of rear air conditioner unit 100.

The operation of cooling apparatus for electrical equipment in accordance with the present invention based on the structure and flow chart above, will be described with reference to FIGS. 6A, 6B and 7.

Assume, for example, that the A/C intake mode is selected as the operation mode, while the rear air conditioner unit 100 is in operation.

Here, the A/C intake mode is selected (YES at S100) and, therefore, whether the absolute value of temperature difference Thi−Tlo is larger than the predetermined value A and the temperature Thi is smaller than the predetermined value B is determined (S102).

If the flow rate of air supplied to high voltage battery 500 is limited in the A/C intake mode, the degree of cooling of upstream side battery cell becomes higher, and temperature difference (temperature variation) between the battery cells increases. If the absolute value of temperature difference Thi−Tlo is larger than the predetermined value A and the temperature Thi is smaller than the predetermined value B (YES at S102), the operation mode of rear air conditioner unit 100 is switched to the compartment intake mode (S106).

Figure 6A:
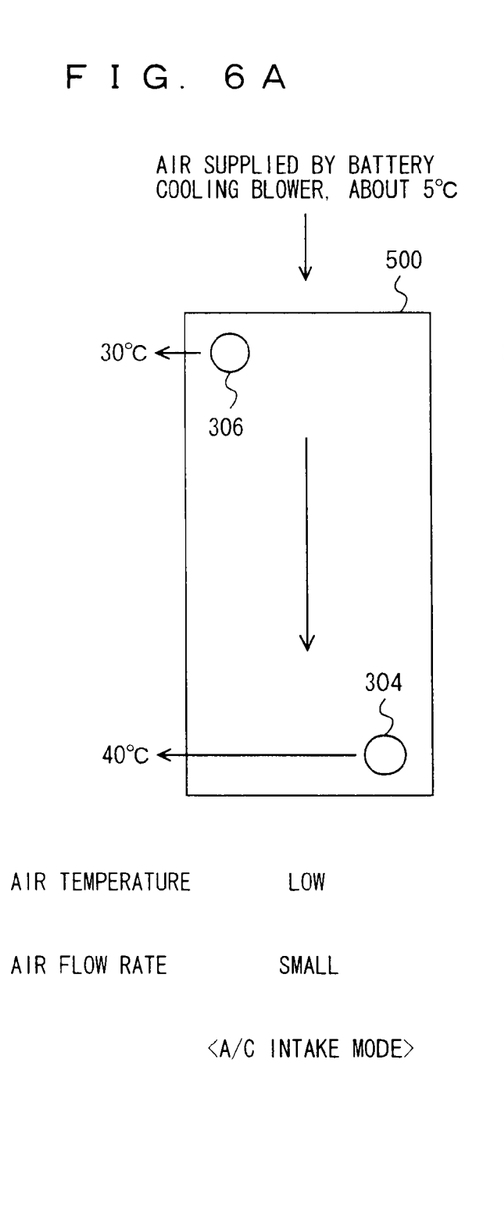
FIGS. 6A and 6B are illustrations showing the operation of cooling apparatus for electrical equipment in accordance with the embodiment.
Figure 6B:
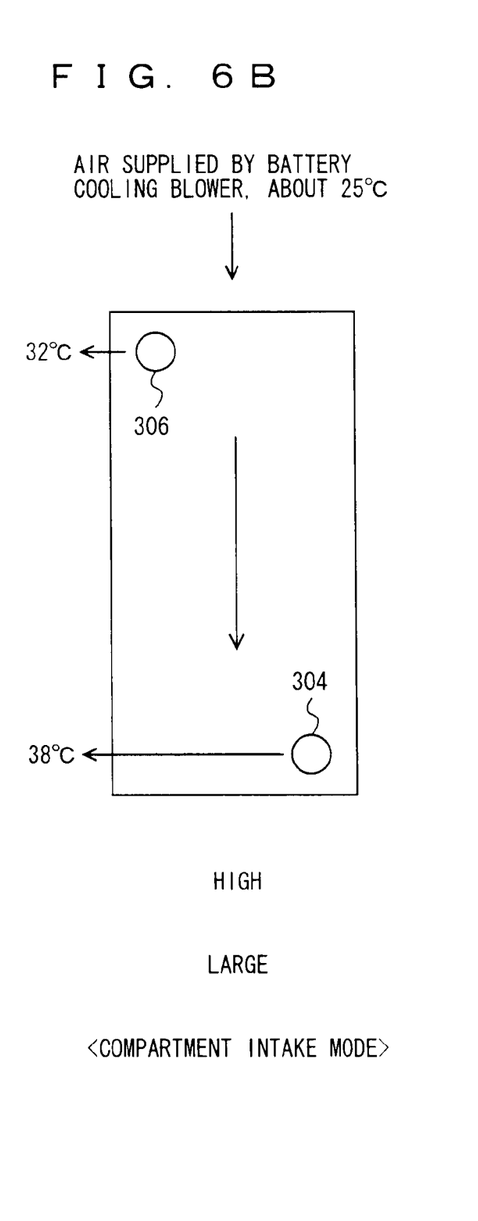

At this time, in the A/C intake mode, air of lower temperature than the air in the compartment of the vehicle is supplied to high voltage battery 500, as shown in FIG. 6A. Assume that the air temperature is 5° C. The temperature values indicated below are examples used for convenience for describing the operation of cooling apparatus for electrical equipment in accordance with the present embodiment.

A battery cell 512 on the upstream side of the air inside high voltage battery 500 is cooled by heat exchange with the air of about 5° C. Therefore, the degree of cooling of battery cell 512 is large. Therefore, it is assumed that the temperature of battery cell 512 is cooled to about 30° C.

The air temperature increases as the air flows to the downstream side of high voltage battery 500. This is because the air is subjected to heat exchange with battery cells as it flows to the downstream side. Further, if the A/C intake mode is selected as the operation mode of rear air conditioner unit 100, it follows that rear air conditioner blower 600 operates in coordination with the air conditioning in the compartment and, therefore, the flow rate of air supplied from rear air conditioner blower 600 is limited. Therefore, the flow rate of air supplied from battery cooling blower 400 to high voltage batter 500 is also limited.

Therefore, if the flow rate of air supplied to high voltage battery 500 is low, the temperature of air increases quickly before reaching battery cell 510 on the downstream side, and hence, it is cooled only to about 40° C. At this time, temperature difference between battery temperature detection sensor 304 and battery temperature detection sensor 306 is 10° C.

When the operation mode is switched from A/C intake mode to compartment intake mode, the air taken from inlets 150 and 152 does not pass through evaporator 1000 but flows through cooling duct 160 and supplied to high voltage battery 500. Therefore, it follows that the air supplied to high voltage battery 500 has substantially the same temperature as the vehicle compartment. It is assumed that the air temperature is about 25° C., as shown in FIG. 6B.

Battery cell 512 on the upstream side of high voltage battery 500 is cooled through heat exchange with the air of about 25° C. The degree of cooling is lower than in the A/C intake mode. It is assumed, therefore, that the temperature of battery cell 512 is cooled to about 32° C.

The temperature of air increases as it flows to the downstream side of high voltage battery 500. This is because the air is subjected to heat exchange with battery cells as it flows to the downstream side. Further, if the compartment intake mode is selected as the operation mode of rear air conditioner unit 100, battery cooling blower 400 operates not in coordination with air conditioning of the compartment. Therefore, it is possible to supply the air of which flow rate corresponds to the temperature of battery cell, from battery cooling blower 400 to high voltage battery 500.

Therefore, when the flow rate of air in the compartment intake mode is set larger than the flow rate of air in the A/C intake mode, the degree of temperature increase of the air flowing to the downstream side becomes lower even if the air temperature is high and, therefore, degree of temperature decrease of battery cell 510 at the downstream side becomes higher. As a result, the battery cell 510 on the downstream side is cooled to about 38° C. At this time, temperature difference between battery temperature detection sensor 304 and battery temperature detection sensor 306 is reduced to about 6° C. Specifically, increase in temperature difference between battery cells 510 and 512 included in high voltage battery 500 can be prevented.

The flow rate of air in the compartment intake mode is not specifically limited, provided that the flow rate is not lower than the air flow rate in the A/C intake mode.

Further, if the A/C intake mode is selected (YES at S100) and the absolute value of temperature difference Thi−Tlo is equal to or lower than the predetermined value A, or the temperature Thi is equal to or higher than the predetermined value B (NO at S102), normal intake mode switching control takes place in rear air conditioner unit 100 (S116).

Further, if operation mode is switched to the compartment intake mode (NO at S100, YES at S104), it means that the compartment intake mode is requested to prevent increase in temperature difference (YES at S108), and therefore, whether or not the absolute value of temperature difference Thi−Tlo is equal to or lower than the predetermined value A is determined (S110).

If the absolute value of temperature difference Thi−Tlo is equal to or lower than the predetermined value A (YES at S110), normal intake mode switching control takes place in rear air conditioner unit 100 (S116). If the absolute value of temperature difference Thi−Tlo is larger than the predetermined value A (NO at S110) and the value of temperature Thi is smaller than the predetermined value B (NO at S112), the compartment intake mode is maintained (S106).

If the absolute value of temperature difference Thi−Tlo is larger than the predetermined value A (NO at S110) and the value of temperature Thi is equal to or higher than the predetermined value B (YES at S112), the operation mode of rear air conditioner unit 100 is switched to the A/C intake mode (S114).

If it is not the state in which compartment intake mode is requested to prevent increase in temperature difference (NO at S108) or if the absolute value of temperature difference Thi−Tlo is equal to or lower than the predetermined value A (YES at S110), normal intake mode switching control takes place (S116).

Further, if the operation mode of rear air conditioner unit 100 is neither the A/C intake mode nor the compartment intake mode (NO at S100, NO at S104), normal intake mode switching control takes place (S116).

Figure 7:
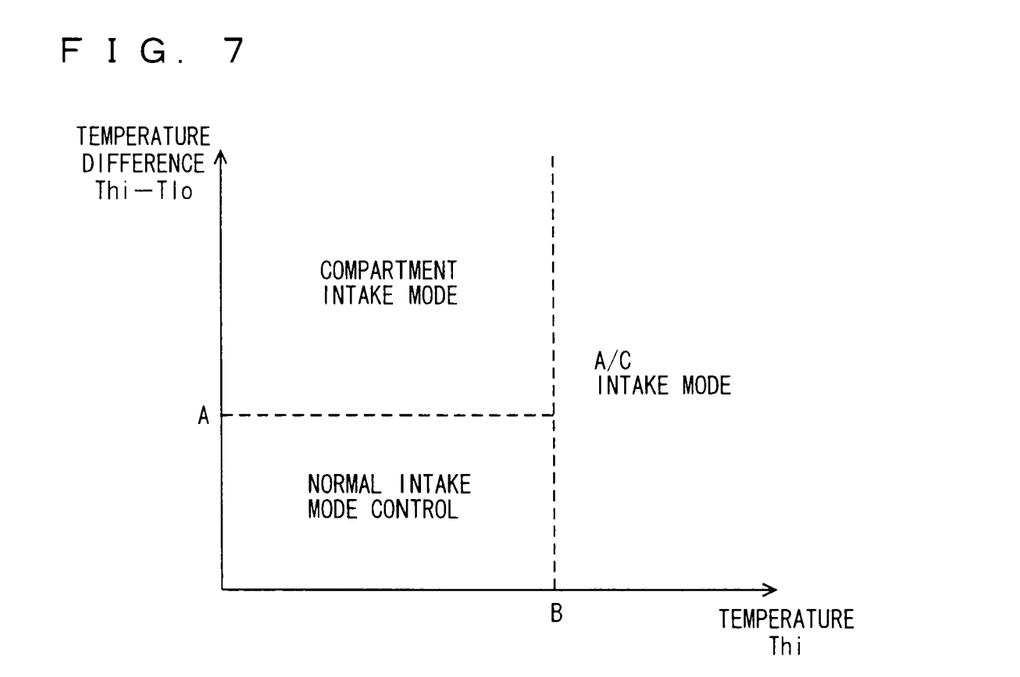
FIG. 7 shows operation modes of a rear air conditioner unit selected based on a relation between temperature difference Thi−Tlo and temperature Thi.

As described above, in the cooling apparatus for electrical equipment in accordance with the present embodiment, if the temperature Thi is equal to or higher than the predetermined value B, rear air conditioner unit 100 operates with the operation mode set to A/C intake mode, regardless of the absolute value of temperature difference Thi−Tlo, as shown in FIG. 7.

Further, if the temperature Thi is lower than the predetermined value B and the absolute value of temperature difference Thi−Tlo is larger than the predetermined value A, rear air conditioner unit 100 operates with the operation mode set to compartment intake mode.

Further, if the temperature Thi is lower than the predetermined value B and the absolute value of temperature difference Thi−Tlo is equal to or lower than the predetermined value A, normal intake mode switching control takes place.

As described above, in the cooling apparatus for electrical equipment in accordance with the present embodiment, if the absolute value of temperature difference Thi−Tlo between at least two battery cells on the upstream side and downstream side of air distributed through high voltage battery becomes larger than the predetermined value A, a route that makes smaller the absolute value in temperature difference between the air and the battery cell on the downstream side is selected from among the plurality of routes. Accordingly, the degree of temperature decrease of the battery cell on the upstream side by the air supplied to the high voltage battery can be reduced. By limiting at least the degree of cooling the battery cell on the upstream side, increase in temperature difference between the battery cells can be prevented. Therefore, cooling apparatus and cooling method for electrical equipment that can prevent increase in temperature difference among a plurality of components included in the electrical equipment can be provided. Further, as the increase in temperature difference is prevented, difference in amount of charge among the battery cells can be reduced, and hence, it becomes easier to control the amounts of charge of all battery cells in a predetermined range.

If the detected temperature Thi of battery cell on the downstream side is equal to or higher than the predetermined value B, a route corresponding to the A/C intake mode, in which the absolute value of temperature difference from the temperature Tlo of battery cell on the downstream side becomes the largest, is selected. As a result, a plurality of battery cells in the high voltage battery can be cooled quickly. Further, it is possible to ensure electrical equipment cooling performance.

By controlling the rear air conditioner blower and the battery cooling blower such that the air flow rate when a route that makes smaller the absolute value of temperature difference is selected exceeds the air flow rate when a route that makes larger the absolute value of temperature difference is selected, increase in temperature of the air flowing to the downstream side through heat exchange with battery cells can be suppressed and, therefore, degree of cooling battery cell on the downstream side can be increased. Therefore, increase in temperature difference between the battery cells on the upstream side and the downstream side can be prevented.

Figure 8:
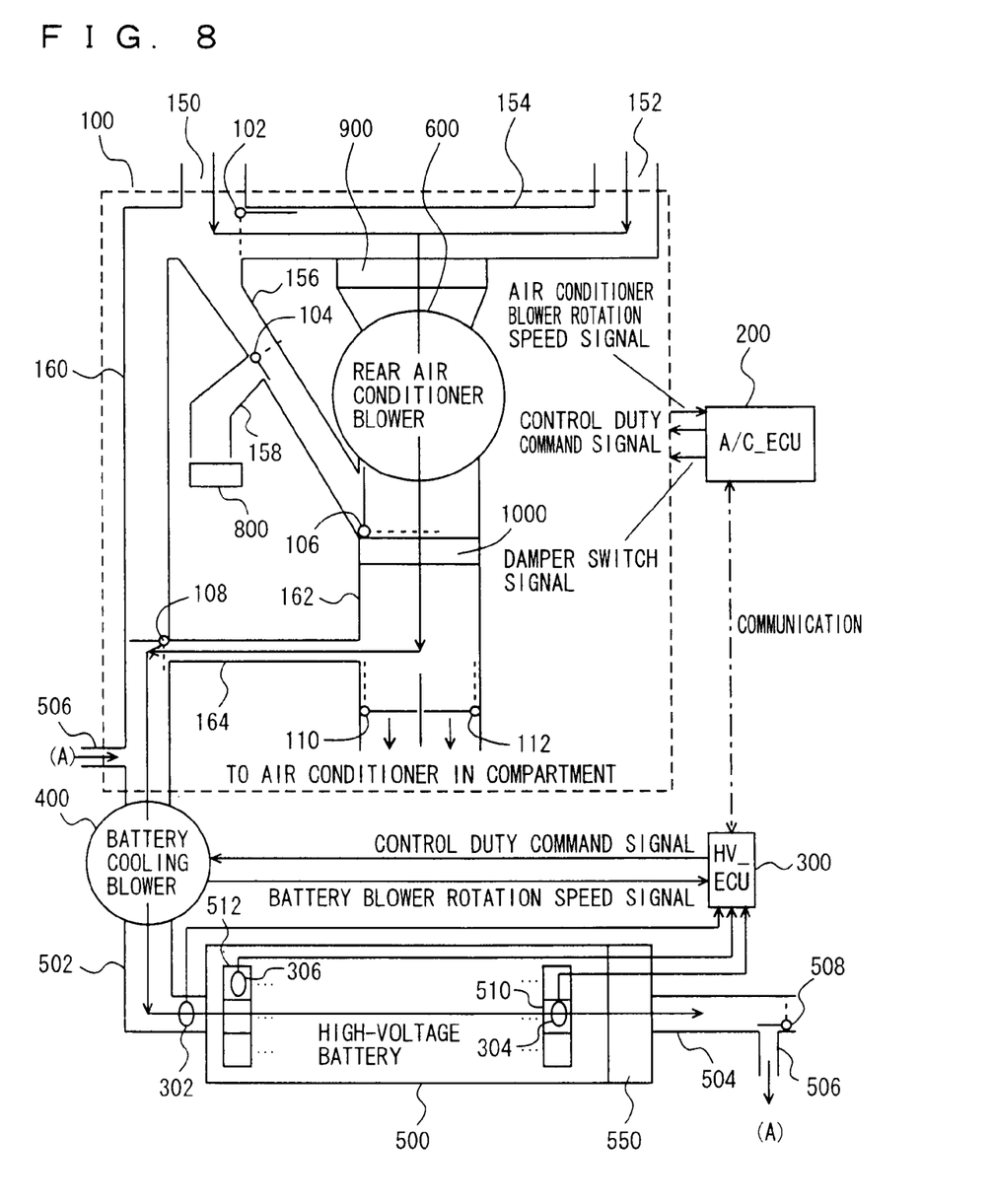
FIG. 8 shows a configuration of another implementation of the cooling apparatus for electrical equipment.

The distribution route for the compartment intake mode is not limited to the route described with reference to FIG. 2. For instance, if air conditioning to the compartment is unnecessary, that is, if operation of evaporator 1000 is stopped, the air taken through inlets 150 and 152 may be distributed to rear air conditioner blower 660 and cooling ducts 162 and 164 and supplied through battery cooling blower 400 to high voltage battery 500, as shown in FIG. 8. Switch dampers 110 and 112 are switched such that the downstream side of rear air conditioner blower 600 of cooling duct 162 is shut off from the air conditioner outlet in the compartment.

By such an arrangement, it becomes possible to supply air from battery cooling blower 400 and rear air conditioner blower 600 to high voltage battery 500 and, therefore, the amount of supply can be increased. Further, the supplied air is of the same temperature as the air in compartment. This can also prevent increase in temperature difference.

Alternatively, as shown in FIG. 8, a connection passage 506 (FIG. 8(A)) branching from a middle portion of cooling duct 504 on the downstream side of high voltage battery 500 and connected to cooling duct 160 on the upstream side of battery cooling blower 400 may be provided and, in addition, a switch damper 508 may further be provided at a middle portion of cooling duct 504. Switch damper 508 communicates or shuts off the space between cooling duct 504 and connecting passage 506. Switch dampers 110 and 112 may be set such that the downstream side of rear air conditioner blower 600 of cooling duct 162 and the air conditioner outlet in the compartment are communicated.

If the cooling duct 504 and connection passage 506 are communicated, the air discharged from DC/DC converter 550 flows from cooling duct 504 to connection passage 506, and distributed to cooling duct 160 on the upstream side of battery cooling blower 400. With this arrangement, it is possible to supply the air, of which temperature is increased by high voltage battery 500 and DC/DC converter 550 again to high voltage battery 500 through battery cooling blower 400. At this time, if the amount of supply by battery cooling blower 400 is increased, the air flow rate distributed from DC/DC converter 550 through connection passage 506 to cooling duct 160 increases and, therefore, the flow rate is not limited by air conditioning. Here, it is possible to supply air with the flow rate not smaller than the flow rate in the A/C intake mode. Further, air of higher temperature than in the A/C intake mode is supplied to high voltage battery 500. In this manner also, increase in temperature difference among battery cells included in high voltage battery 500 can be prevented.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A method of cooling electrical equipment including a plurality of components, wherein said electrical equipment includes a medium passage, said medium passage including a first end connected to an inlet and a second end connected to said electrical equipment and said medium passage including a plurality of cooling medium distribution routes between said inlet and said electrical equipment, and a supply source supplying a cooling medium through said medium passage to said electrical equipment, said method comprising:

detecting a temperature difference between at least two components on upstream and downstream sides, respectively, of said cooling medium among said plurality of components;

selecting at least one of said plurality of cooling medium distribution routes when an absolute value of said temperature difference between said at least two components detected from said detecting exceeds a predetermined value, to prevent an increase in temperature variation between said at least two components; and supplying said cooling medium from said inlet to said electrical equipment via said at least one of said plurality of cooling medium distribution routes selected from said selecting.

2. The method of cooling electrical equipment according to claim 1, wherein said detecting includes:
detecting a first temperature of a first component on said upstream side, and
detecting a second temperature of a second component on said downstream side; and wherein said selecting includes selecting, when said detected second temperature is equal to or higher than a predetermined temperature, a route that maximizes an absolute value of temperature difference between a temperature of said cooling medium and either one of said first and second temperatures, from among said plurality of cooling medium distribution routes.

3. The method of cooling electrical equipment according to claim 2, wherein said first component is a component located at a position of lower temperature than a position of said second component during operation of said supply source.

4. The method of cooling electrical equipment according to claim 2, further comprising:

controlling said supply source such that, when a route that includes a smaller absolute value of temperature difference between said cooling medium and either one of said first temperature and second temperature is selected, a flow rate of said cooling medium is higher than when a route that includes a larger absolute value of temperature difference is selected.

5. The method of cooling electrical equipment according to claim 2, wherein said electrical equipment is mounted on a vehicle,
wherein said cooling medium is a gas,
wherein said supply source is a first supply source, and
wherein in a distribution route of said plurality of cooling medium distribution routes, a second supply source is provided between said inlet and said first supply source to supply said cooling medium to said electrical equipment and to a compartment of said vehicle.

6. The method of cooling electrical equipment according to claim 5, wherein said inlet is provided in the compartment of said vehicle,
wherein a heat exchanger is provided on a downstream side of said second supply source to conduct heat exchange with air from the compartment of said vehicle and distributed to said inlet, and
wherein said route that maximizes the absolute value of temperature difference passes through said second supply source and said heat exchanger.

7. The method of cooling electrical equipment according to claim 2, wherein said first component is a first battery cell of said electrical equipment and said second component is a second battery cell of said electrical equipment.

8. The method of cooling electrical equipment according to claim 1,
wherein said medium passage includes a switching mechanism to switch a distribution route of said plurality of cooling medium distribution routes at a position where said distribution route is branched; and
wherein said selecting includes selecting said distribution route by switching said switching mechanism.

9. The method of cooling electrical equipment according to claim 1,
wherein said electrical equipment is mounted on a vehicle,
wherein said cooling medium is a gas,
wherein said supply source is a first supply source, and
wherein in a distribution route of said plurality of cooling medium distribution routes, a second supply source is provided between said inlet and said first supply source to supply said cooling medium to said electrical equipment and to a compartment of said vehicle.

10. The method of cooling electrical equipment according to claim 9, wherein
said inlet is provided in the compartment of said vehicle,
a heat exchanger is provided on a downstream side of said second supply source to conduct heat exchange with air from the compartment of said vehicle and distributed to said inlet.

11. The method of cooling electrical equipment according to claim 1, wherein said electrical equipment is a power storage device including a plurality of power storage elements.

12. A method of cooling electrical equipment by supplying a cooling medium via a medium passage having a plurality of cooling medium distribution routes, the medium passage including a first end connected to an inlet and a second end connected to the electrical equipment, the method comprising:
detecting a temperature difference between at least two components of the electrical equipment; and
selecting at least one of the plurality of cooling medium distribution routes to convey the cooling medium from the inlet to the at least two components of the electrical equipment, when an absolute value of the detected temperature difference between the at least two components exceeds a predetermined value, in order to prevent an increase in temperature variation between the at least two components,
wherein the selecting includes selecting between a first route, to convey the cooling medium past a first supply unit, a second supply unit, and a heat exchanger, and a second route, to convey the cooling medium past the first supply unit and bypasses both the second supply unit and the heat exchanger.

13. The method of cooling electrical equipment according to claim 12, wherein the inlet is provided in a compartment of a vehicle.

14. The method of cooling electrical equipment according to claim 12, wherein the selecting further includes selecting an additional route such that a portion of the cooling medium is conveyed to the compartment of the vehicle, the cooling medium passing both the second supply unit and the heat exchanger.

15. The method of cooling electrical equipment according to claim 12, wherein a first component of the at least two components is disposed on an upstream side of the electrical equipment and a second component of the at least two components is disposed on a downstream side of the electrical equipment.

16. A method of cooling electrical equipment including a plurality of components, wherein said electrical equipment includes a medium passage, said medium passage including one end connected to an inlet and another end connected to said electrical equipment and said medium passage including a plurality of cooling medium distribution routes between said inlet and said electrical equipment, and a supply source supplying a cooling medium through said medium passage to said electrical equipment, said method comprising:
detecting a temperature difference between at least two components on upstream and downstream sides, respectively, of said cooling medium among said plurality of components; and
selecting one of said plurality of cooling medium distribution routes,
wherein said selecting includes selecting, when an absolute value of said temperature difference detected exceeds a predetermined value, a route that makes smaller an absolute value of temperature difference between said cooling medium and either one of said at least two components, from among said plurality of cooling medium distribution routes,
wherein said detecting includes:
detecting a first temperature of a first component on said upstream side, and
detecting a second temperature of a second component on said downstream side; and
wherein said selecting includes selecting, when said detected second temperature is equal to or higher than a predetermined temperature, a route that maximizes an absolute value of temperature difference between a temperature of said cooling medium and either one of said first and second temperatures, from among said plurality of cooling medium distribution routes.

* * * * *